(12) United States Patent
Zhou

(10) Patent No.: US 12,361,659 B2
(45) Date of Patent: Jul. 15, 2025

(54) VIRTUAL SCENE DISPLAY METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Zhaoyou Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 113 days.

(21) Appl. No.: 17/975,516

(22) Filed: Oct. 27, 2022

(65) Prior Publication Data

US 2023/0048826 A1    Feb. 16, 2023

Related U.S. Application Data

(63) Continuation of application No. PCT/CN2022/072363, filed on Jan. 17, 2022.

(30) Foreign Application Priority Data

Jan. 25, 2021 (CN) .......................... 202110097445.6

(51) Int. Cl.
G06T 19/20 (2011.01)
G06V 10/74 (2022.01)

(52) U.S. Cl.
CPC ............ *G06T 19/20* (2013.01); *G06V 10/761* (2022.01); *G06T 2219/2016* (2013.01)

(58) Field of Classification Search
CPC ............ G06T 19/20; G06T 2219/2016; G06V 10/761
See application file for complete search history.

(56) References Cited

U.S. PATENT DOCUMENTS

2012/0105446 A1    5/2012    Cao et al.
2013/0321400 A1    12/2013    van Os et al.
(Continued)

FOREIGN PATENT DOCUMENTS

CN    102467756 A    5/2012
CN    111142669 A    5/2020
CN    112717381 A    4/2021

OTHER PUBLICATIONS

Tencent Technology, Extended European Search Report and Supplementary Search Report, EP Application No. 22742118.7, Feb. 27, 2024, 9 pgs.

(Continued)

*Primary Examiner* — Michelle Chin
(74) *Attorney, Agent, or Firm* — Morgan, Lewis & Bockius LLP

(57) ABSTRACT

Embodiments of this application disclose a virtual scene display method performed by a computer device, which relate to the field of virtual scene technologies. The method includes: generating a virtual scene interface, the virtual scene interface including a scene image of a virtual scene captured by a virtual camera; displaying, in the virtual scene interface, a first scene image of one or more virtual objects in the virtual scene captured by the virtual camera using a first representation, the first representation being one of a 2D representation and a 3D representation; and in response to receiving a zoom operation on the virtual scene, displaying, in the virtual scene interface, a second scene image of the one or more virtual objects in the virtual scene captured by the virtual camera using a second representation, the second representation being the other one of the 2D representation and the 3D representation.

17 Claims, 13 Drawing Sheets

(56) References Cited

U.S. PATENT DOCUMENTS

| | | |
|---|---|---|
| 2013/0326384 A1 | 12/2013 | Moore et al. |
| 2015/0355811 A1* | 12/2015 | Ybanez Zepeda .... G06F 3/0488 715/810 |
| 2016/0227132 A1* | 8/2016 | Wooley ................ H04N 5/2224 |
| 2020/0388070 A1 | 12/2020 | Jiang et al. |

OTHER PUBLICATIONS

Tencent Technology, WO, PCT/CN2022/072363, Apr. 13, 2022, 4 pgs.
Tencent Technology, IPRP, PCT/CN2022/072363, Jul. 20, 2023, 5 pgs.
Tencent Technology, ISR, PCT/CN2022/072363, Apr. 13, 2022, 2 pgs.
Tencent Technology, Korean Office Action, KR Patent Application No. 10-2023-7020044, Jan. 3, 2025, 11 pgs.
Tencent Technology, Indian Office Action, IN Patent Application No. 202347013612, Mar. 5, 2025, 7 pgs.

* cited by examiner

VIRTUAL SCENE DISPLAY METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/072363, entitled "VIRTUAL SCENE DISPLAY METHOD, APPARATUS AND DEVICE, STORAGE MEDIUM, AND PROGRAM PRODUCT" filed on Jan. 17, 2022, which claims priority to Chinese Patent Application No. 202110097445.6, filed with the State Intellectual Property Office of the People's Republic of China on Jan. 25, 2021, and entitled "VIRTUAL SCENE DISPLAY METHOD AND APPARATUS, COMPUTER DEVICE, AND STORAGE MEDIUM", all of which are incorporated herein by reference in their entirety.

FIELD OF THE TECHNOLOGY

This application relates to the field of virtual scene technologies, and in particular, to a virtual scene display method and apparatus, a device, a storage medium, and a program product.

BACKGROUND OF THE DISCLOSURE

At present, in a strategy game, a user can select to display a game scene in a 2D or 3D representation.

In the related art, a game client supporting both a 2D representation and a 3D representation can provide a 2D/3D setting function. Before enters the game scene, the user can set a representation of the game scene through the setting function, for example, set the representation of the game scene to the 3D representation. After the user enters the game scene subsequently, the game client displays a 3D game scene.

However, in the related art, when the user needs to switch the representation of the game scene, the user needs to exit the game scene for setting and then re-enter the game scene, causing a complex operation process of the user, which affects the switching efficiency of the representation of the game scene.

SUMMARY

Embodiments of this application provide a virtual scene display method and apparatus, a device, a storage medium, and a program product. The technical solutions are as follows:

According to one aspect, the embodiments of this application provide a virtual scene display method performed by a computer device, the method including:
  generating a virtual scene interface, the virtual scene interface including a scene image of a virtual scene captured by a virtual camera;
  displaying, in the virtual scene interface, a first scene image of one or more virtual objects in the virtual scene captured by the virtual camera using a first representation, the first representation being one of a 2D representation and a 3D representation; and
  in response to receiving a zoom operation on the virtual scene, displaying, in the virtual scene interface, a second scene image of the one or more virtual objects in the virtual scene captured by the virtual camera using a second representation, the second representation being the other one of the 2D representation and the 3D representation.

According to another aspect, the embodiments of this application provide a virtual scene display apparatus, including:
  an interface display module, configured to generate a virtual scene interface, the virtual scene interface including a scene image of a virtual scene captured by a virtual camera;
  a first image display module, configured to display, in the virtual scene interface, a first scene image of one or more virtual objects in the virtual scene captured by the virtual camera using a first representation, the first representation being one of a 2D representation and a 3D representation; and
  a second image display module, configured to, in response to receiving a zoom operation on the virtual scene, display, in the virtual scene interface, a second scene image of the one or more virtual objects in the virtual scene captured by the virtual camera using a second representation, the second representation being the other one of the 2D representation and the 3D representation.

In a possible implementation, the second image display module includes:
  an information acquisition submodule, configured to acquire, in response to receiving the zoom operation, height change information of the virtual camera before and after the zoom operation, the height change information of the virtual camera is used for indicating a distance change between the virtual camera and the virtual scene; and
  a display submodule, configured to display, in the virtual scene interface, the second scene image of the one or more virtual objects in the virtual scene captured by the virtual camera using the second representation when the height change information meets a first height change condition.

In a possible implementation, the second image display module further includes:
  a condition determining submodule, configured to determine that the height change information meets the first height change condition in response to the height change information indicating that the height of the virtual camera changes from a height range of the first representation to a height range of the second representation.

In a possible implementation, the second image display module is configured to:
  activate a data resource management assembly of the second representation, in response to receiving the zoom operation; and
  display the second scene image in the virtual scene interface in the second representation through the data resource management assembly of the second representation based on the height change information of the virtual camera after the zoom operation.

In a possible implementation, the apparatus further includes:
  a state control module, configured to control a data resource management assembly of the first representation to enter an inactive state; and
  a data resource destruction module, configured to destroy a data resource managed by the data resource management assembly of the first representation.

In a possible implementation, the data resource destruction module is configured to destroy the data resource managed by the data resource management assembly of the first representation in response to a duration for the data resource management assembly of the first representation in the inactive state reaching a first duration threshold.

In a possible implementation, the apparatus further includes:

a preload module, configured to preload a data resource managed by the data resource management assembly of the second representation in response to the height change information meeting a second height change condition, where the second height change condition includes: the height change information indicates that the height of the virtual camera is within a height range of the first representation, and a minimum height distance between the height of the virtual camera and a height range of the second representation is less than a distance threshold.

In a possible implementation, the second height change condition further includes: the height change information indicates that the height of the virtual camera changes to the height range of the second representation.

In a possible implementation, the second image display module is configured to:

determine a target block visible to a user in the virtual scene based on the height of the virtual camera after the zoom operation;

load a target data resource of the second representation corresponding to the target block in static data through the data resource management assembly of the second representation; and display the second scene image in the virtual scene interface in the second representation based on the target data resource.

In a possible implementation, the apparatus further includes:

a data deletion module, configured to delete, in response to the static data including other resources than the target data resource, the other resources from the static data.

In a possible implementation, the data deletion module is configured to delete the other resources from the static data in response to an unused duration of the other resources reaching a second duration threshold.

In a possible implementation, the apparatus further includes:

a performance parameter acquisition module, configured to acquire a performance parameter of a terminal displaying the virtual scene interface, where the performance parameter is used for indicating graphic display performance of the terminal; and a range division information acquisition module, configured to acquire height range division information based on the performance parameter, where the height range division information includes the height range of the first representation and the height range of the second representation.

In a possible implementation, the first representation is the 2D representation, the second representation is the 3D representation, and the zoom operation is a zoom-in operation on the virtual scene; or the first representation is the 3D representation, the second representation is the 2D representation, and the zoom operation is a zoom-out operation on the virtual scene.

According to another aspect, the embodiments of this application provide a computer device, including a processor and a memory, the memory storing at least one computer program, the at least one computer program being loaded and executed by the processor and causing the computer device to implement the virtual scene display method described in the foregoing aspect.

According to another aspect, the embodiments of this application provide a non-transitory computer-readable storage medium, storing at least one computer program, the at least one computer program being loaded and executed by a processor of a computer device and causing the computer device to implement the virtual scene display method described in the foregoing aspect.

According to an aspect of this application, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to implement the virtual scene display method provided in the implementations of the foregoing aspect.

The technical solutions provided in the embodiments of this application include at least the following beneficial effects:

When the scene image is displayed in the virtual scene interface in the 2D representation or the 3D representation, the scene image of the virtual scene can be switched to another representation of the 2D representation and the 3D representation under the trigger of the zoom operation on the virtual scene. In the foregoing process, the user does not need to exit the scene image for setting, and only needs to reuse the zoom operation on the virtual scene, to implement flexible switching of the representation on the scene image, thereby significantly reducing the complexity of the operation process of the user and improving the switching efficiency of the representation of the virtual scene.

DESCRIPTION OF EMBODIMENTS

Virtual scene: a virtual scene displayed (or provided) when an application is run on a terminal. The virtual scene may be a simulated environment scene of a real world, or may be a semi-simulated semi-fictional 3D environment scene, or may be an entirely fictional 3D environment scene. The virtual scene may be any one of a 2D virtual scene, a 2.5D virtual scene, or a 3D virtual scene, and description is made by using an example in which the virtual scene is a 2D virtual scene or a 3D virtual scene in the following embodiments, but this is not limited.

The virtual scene is generally generated by an application in a terminal such as a computer device and displayed based on hardware (for example, a screen) in the terminal. The terminal may be a mobile terminal such as a smartphone, a tablet computer, or an ebook reader; or the terminal may be a personal computer device such as a notebook computer or a fixed computer.

Strategy game: Strategy game is a derivative game type (or branch) of a simulation game (SLG). When a simulation object of the simulation game is not only an object (such as a vehicle), a player needs to ensure that the simulation object reaches the goal specified in the game when playing the game. Simulation games are generally free and open, and therefore the player needs to attempt to achieve the goal within the limits recognized by the game (game rules). This gives birth to a new type of game—strategy game. Simulation games are generally free and open, and therefore the player needs to use wisdom to play the game within the limits recognized by the game (game rules).

Strategy games provide the player with an environment in which the player may brainstorm to deal with complex matters. Strategy games allow the player to freely control, manage and use people or things in the game. Through this free means and the methods that the player brainstorms to fight the enemy, the goals required by the game are achieved.

The meaning of the strategy game itself is quite broad. As long as the player needs to use strategies to complete the goals given by the game and win, the game may be regarded as a strategy game. In this sense, most puzzle games are strategy games. The "strategies" contained in strategy games are generally complex. Every strategy game is not only for "puzzle", but focuses on tactical division, psychological warfare, and opportunity utilization.

Strategy games may be divided into strategic games and tactical games according to the scale; strategy games may be divided into turn based strategy games and real-time strategy games (RTS) according to the mode of progress; and strategy games may be divided into tactical shooting games, abstract strategy games, strategic role-playing games, simulated role-playing games, and puzzle games according to the theme.

Figure 1:
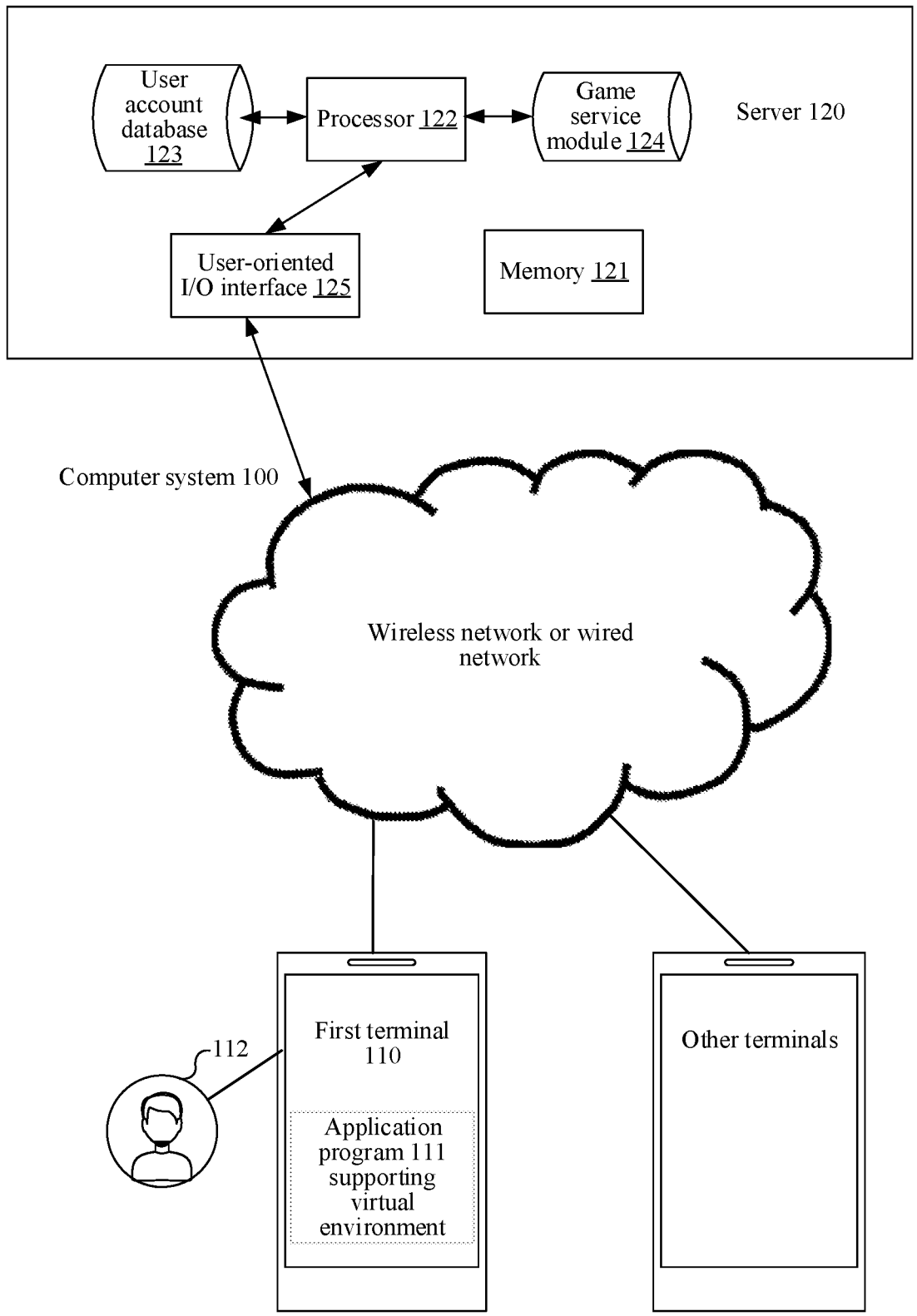
FIG. 1 is a schematic diagram of a virtual scene display system according to an exemplary embodiment of this application.

FIG. 1 shows a schematic diagram of a virtual scene display system according to an embodiment of this application. The system may include: a first terminal 110, and a server 120.

An application 111 supporting a virtual scene is installed and run on the first terminal 110, and the application 111 may be a multiplayer online battle program. When the first terminal runs the application 111, a user interface of the application 111 is displayed on a screen of the first terminal 110. The application 111 may be a strategy game. The first terminal 110 is a terminal used by a first user 112. The first user 112 uses the first terminal 110 to control a first virtual object located in the virtual scene to play the game, and the first virtual object may be referred to as a main control virtual object of the first user 112. For example, the first virtual object is a first virtual character such as a simulated character or a cartoon character.

FIG. 1 shows only one terminal. However, a plurality of other terminals may access the server 120 in different embodiments. In some embodiments, one or more terminals are terminals corresponding to a developer. A developing and editing platform for the application supporting a virtual scene is installed on the terminal. The developer may edit and update the application on the terminal and transmit an updated application installation package to the server 120 through a wired or wireless network. The first terminal 110 may download the application installation package from the server 120 to update the application.

The first terminal 110 and the other terminals are connected to the server 120 through a wireless network or a wired network.

The server 120 includes at least one of one server, a server cluster including a plurality of servers, a cloud computing platform, and a virtualization center.

In a schematic example, the server 120 includes a memory 121, a processor 122, a user account database 123, a game service module 124, and a user-oriented input/output (I/O) interface 125. The processor 122 is configured to load instructions stored in the server 120, and process data in the user account database 123 and the game service module 124. The user account database 123 is configured to store data used by the first terminal 110 and the other terminals, for example, avatars, nicknames, battle effectiveness indexes, and service zones. The battle service module 124 is configured to provide a plurality of game scenes for the user to play the game, for example, a 1V1 game, a 3V3 game, or a 5V5 game. The user-oriented I/O interface 125 is configured to establish communication between the first terminal 110 and/or the other terminals through a wireless network or a wired network for data exchange.

Figure 2:
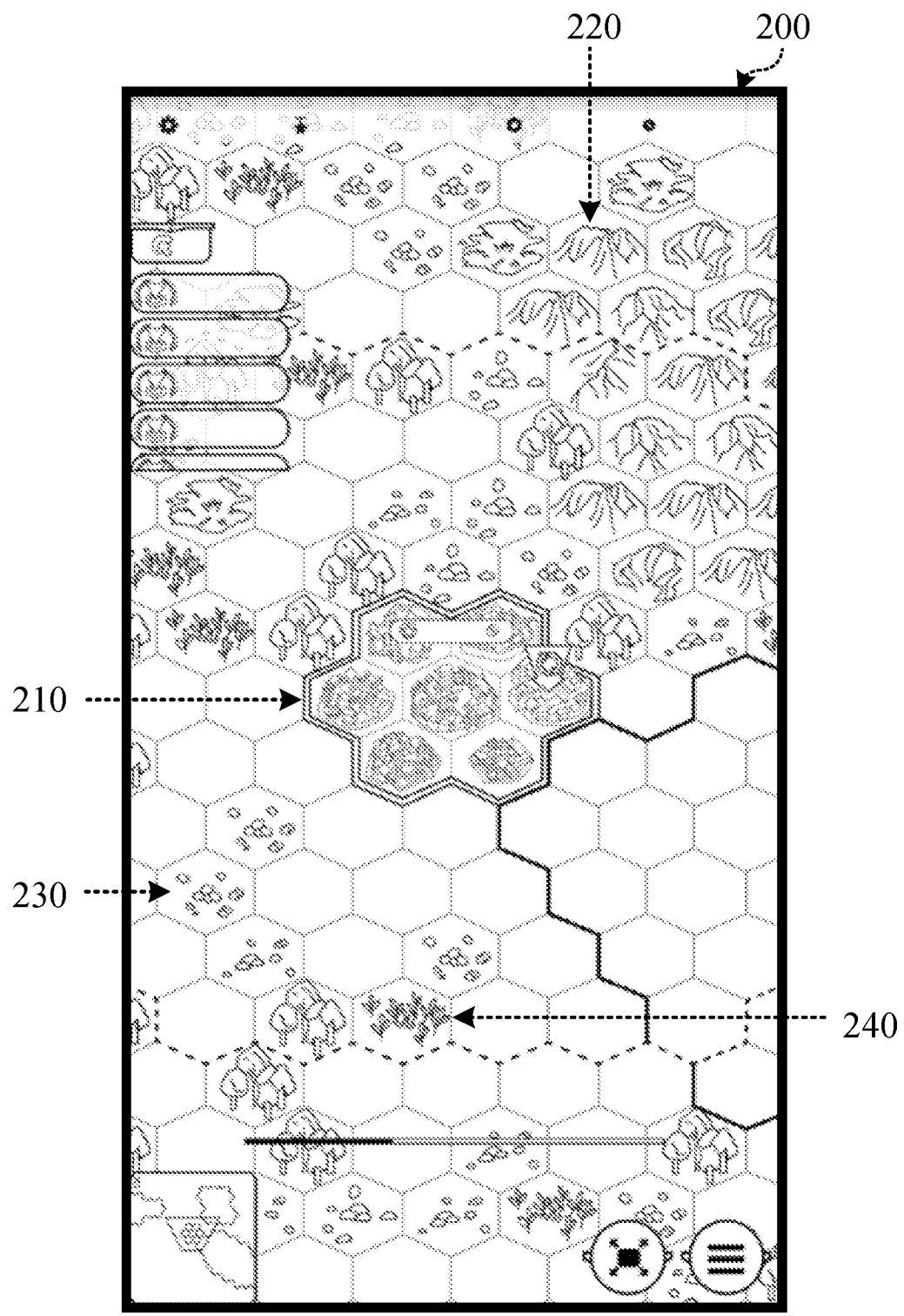
FIG. 2 is a schematic diagram of a virtual scene interface according to an exemplary embodiment of this application.

The virtual scene may be a 3D virtual scene, or the virtual scene may be a 2D virtual scene. That is, a representation of the virtual scene may switch between 2D and 3D. Using an example in which the virtual scene is a 2D virtual scene, FIG. 2 shows a schematic diagram of a virtual scene interface according to an exemplary embodiment of this application. As shown in FIG. 2, the virtual scene interface includes a scene image 200, and the scene image 200 includes various visible elements in the virtual scene, such as a city 210, a mountainous region 220, a resource point 230, and a woodland 240.

The user may control the current virtual object to perform game activities of management class, such as urban construction, resource collection, personnel management, and battle initiation.

In subsequent embodiments of this application, the virtual scene provides a 2D representation and a 3D representation, and in a display process, the scene image of the virtual scene switches between the 2D representation and the 3D representation.

Figure 3:
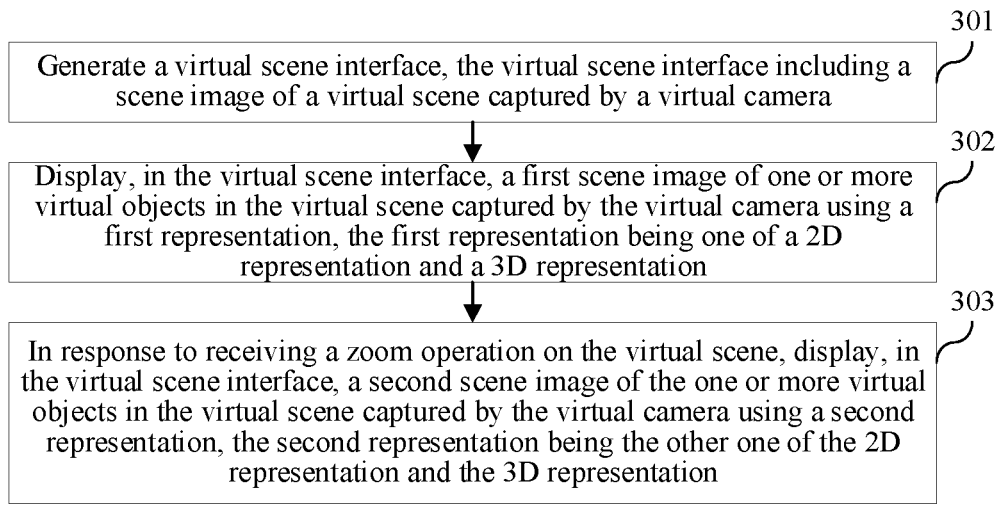
FIG. 3 is a schematic flowchart of a virtual scene display method according to an exemplary embodiment of this application.

FIG. 3 shows a schematic flowchart of a virtual scene display method according to an exemplary embodiment of this application. The method may be performed by a computer device. The computer device may be a terminal or a server, or the computer device may further include the foregoing terminal and server. As shown in FIG. 3, the computer device may control the display of the virtual scene through the following steps:

Step 301. Generate a virtual scene interface, the virtual scene interface including a scene image of a virtual scene captured by a virtual camera.

Step 302. Display, in the virtual scene interface, a first scene image of one or more virtual objects in the virtual scene captured by the virtual camera using a first representation, the first representation being one of a 2D representation and a 3D representation.

Step 303. In response to receiving a zoom operation on the virtual scene, display, in the virtual scene interface, a second scene image of the one or more virtual objects in the virtual scene captured by the virtual camera using a second representation, the second representation being the other one of the 2D representation and the 3D representation.

The zoom operation on the virtual scene refers to a zoom-in/out operation on a virtual lens that collects the scene image of the virtual scene.

When a zoom-in operation is performed on the virtual lens, sizes of scene elements in the virtual scene are increased, and details are increased. Accordingly, the visible range of the virtual scene displayed in the virtual scene interface is reduced, which is equivalent to enlarging the display scale of the virtual scene.

Conversely, when a zoom-out operation is performed on the virtual lens, sizes of scene elements in the virtual scene are reduced in the scene image, and details are reduced. Accordingly, the visible range of the virtual scene displayed in the virtual scene interface is increased, which is equivalent to reducing the display scale of the virtual scene.

In a possible implementation, a second scene image of the virtual scene in a second representation is displayed in the virtual scene interface in response to receiving a zoom on the virtual scene and the zoom operation meeting a specified condition.

In a possible implementation, the zoom operation meeting a specified condition may include at least one of the following situation:

1) A change situation of the height of the virtual camera before and after the zoom operation meets the condition, where the height of the virtual camera is used for controlling a field of view of the scene image of the virtual scene.

For example, the virtual camera is configured to collect the scene image of the virtual scene. The height change information of the virtual camera is used for indicating a distance change between the virtual camera and the virtual scene on a vertical coordinate system in the same 3D coordinate system. When the angle of view of the virtual camera is unchanged, a higher height of the virtual camera indicates a larger range of the virtual scene (that is, the field of view of the scene image of the virtual scene) that can be photographed. Conversely, a lower height of the virtual camera indicates a smaller range of the virtual scene that can be photographed.

2) An operation rate of the zoom operation meets the condition.

For example, when the zoom operation is a slide touch operation, the operation rate of the zoom operation may be a slide rate of the slide touch operation.

3) An operation amplitude of the zoom operation meets the condition.

For example, when the zoom operation is a slide touch operation, the operation amplitude of the zoom operation may be a slide distance of the slide touch operation.

In this embodiment of this application, the application of the virtual scene corresponds to display modes of two different representations (2D and 3D) provided by the virtual scene, and in the process of displaying images with the single object of the virtual scene as a target, the user may switch the scene image of the virtual scene between the 2D representation and the 3D representation through the zoom operation on the virtual scene.

For example, when the scene image is displayed in the virtual scene interface in the 2D representation, if a zoom-in operation that meets the condition is received, it indicates that the user needs to observe a more detailed scene image. In this case, the scene image may be switched to the 3D representation to improve the detail display effect. If a zoom-out operation that meets the condition is received, it indicates that the user needs a wider field of view. In this case, the scene image may be switched to the 2D representation to reduce the resource consumption of the terminal and ensure the image smoothness.

In conclusion, in the solutions in the embodiments of this application, when the scene image is displayed in the virtual scene interface in the 2D representation or the 3D representation, the scene image of the virtual scene can be switched to another representation of the 2D representation and the 3D representation under the trigger of the zoom operation on the virtual scene. In the foregoing process, the user does not need to exit the scene image for setting, and only needs to reuse the zoom operation on the virtual scene, to implement flexible switching of the representation on the scene image, thereby significantly reducing the complexity of the operation process of the user and improving the switching efficiency of the representation of the virtual scene.

Figure 4:
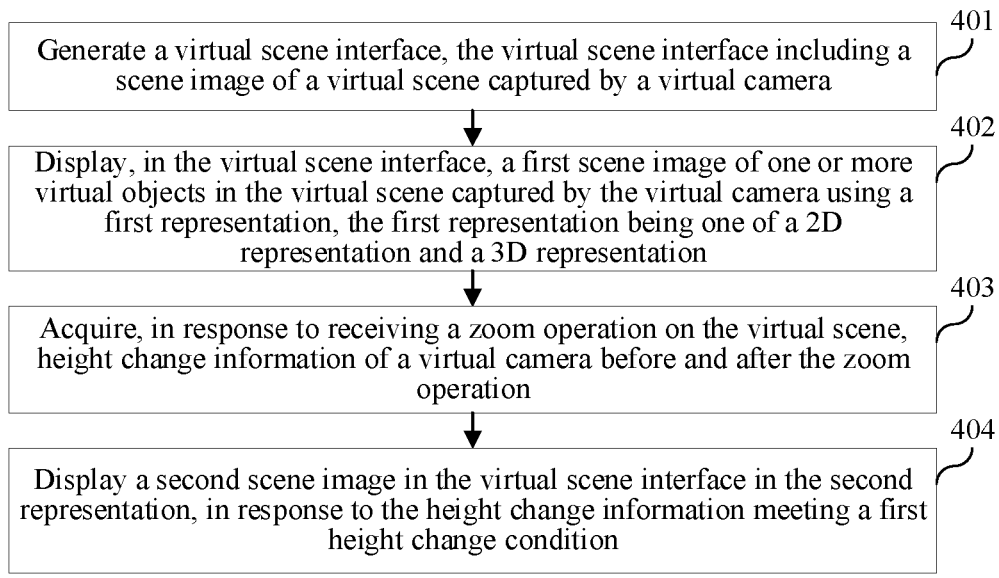
FIG. 4 is a schematic flowchart of a virtual scene display method according to an exemplary embodiment of this application.

Using an example in which the zoom operation meeting the specified condition includes that the change situation of the height of the virtual camera before and after the zoom operation meets the condition, FIG. 4 shows a schematic flowchart of a virtual scene display method according to an exemplary embodiment of this application. The method may be performed by a computer device. The computer device may be a terminal, or a server, or the computer device may further include the foregoing terminal and server. As shown in FIG. 4, using an example in which the computer device is a terminal, the terminal may control the display of the virtual scene through the following steps:

Step 401. Generate a virtual scene interface, the virtual scene interface including a scene image of a virtual scene captured by a virtual camera.

In this embodiment of this application, when an application of a virtual scene starts, a virtual scene interface may be displayed first, and the virtual scene interface is used for displaying a scene image of the virtual scene. In some embodiments, one or more operation controls may further be superimposed and displayed in the virtual scene interface.

Step 402. Display, in the virtual scene interface, a first scene image of one or more virtual objects in the virtual scene captured by the virtual camera using a first representation, the first representation being one of a 2D representation and a 3D representation.

In this embodiment of this application, the virtual scene may provide two types of representations, that is, the 2D representation and the 3D representation.

The 2D representation refers to displaying the scene image of the virtual scene with a 2D image; and the 3D representation refers to displaying the scene image of the virtual scene with a 3D image.

Step 403. Acquire, in response to receiving a zoom operation on the virtual scene, height change information of a virtual camera before and after the zoom operation.

The virtual camera is configured to collect the scene image of the virtual scene; and a height of the virtual camera is used for controlling a field of view of the scene image of the virtual scene.

In a possible implementation, the height change information includes a height of the virtual camera before the zoom operation and a height of the virtual camera after the zoom operation.

In some embodiments, the height change information further includes at least one type of the following information: a height change rate or a height change amount.

In a possible implementation, when the zoom operation is a zoom-in operation on the virtual scene, an application corresponding to the virtual scene can reduce the height of the virtual camera. Conversely, when the zoom operation is a zoom-out operation on the virtual scene, an application corresponding to the virtual scene can increase the height of the virtual camera.

In this embodiment of this application, the zoom operation on the virtual scene may be a slide touch operation in the virtual scene interface. For example, the zoom operation may be a two-finger/three-finger slide operation. For example, an operation of two fingers/three fingers sliding together is a zoom-out operation on the virtual scene; and an operation of two fingers/three fingers sliding away is a zoom-in operation on the virtual scene.

Alternatively, the zoom operation on the virtual scene may be a trigger operation on a specified control. For example, the specified control may include a zoom-out control and a zoom-in control, and a tap/press operation on the zoom-out control is a zoom-out operation on the virtual scene; and a tap/press operation on the zoom-in control is a zoom-in operation on the virtual scene. In another example, the specified control may include a slide condition. The slide operations in different directions on the slide condition are a zoom-out operation and a zoom-in operation on the virtual scene respectively.

Step 404. Display a second scene image of the one or more virtual objects in the virtual scene captured by the virtual camera in the virtual scene interface using the second representation in response to the height change information meeting a first height change condition.

The second representation is another representation of the 2D representation and the 3D representation other than the first representation.

In a possible implementation, the height change information meeting a first height change condition may include at least one of the following condition:

1) A change of a height range of the height of the virtual camera meets the condition.

In this embodiment of this application, when the height of the virtual camera changes from one range to another range, the scene image of the virtual scene may be triggered to switch between the 2D representation and the 3D representation.

For example, it is determined that the height change information meets the first height change condition in response to the height change information indicating that the height of the virtual camera changes from a height range of the first representation to a height range of the second representation.

In an exemplary solution of this embodiment of this application, a display object (or image content) in the virtual scene interface is related to a camera state of the virtual camera, and the camera state of the virtual camera may be determined by the height of the virtual camera.

For example, the display object in the virtual scene interface may include three types: a map of a virtual scene, an overall virtual scene, and a certain scene element in a virtual scene (such as a city, a mountain, a woodland or a mineral deposit in the virtual scene). That is, subjects of the virtual camera are different at different heights of the virtual camera.

Figure 5:
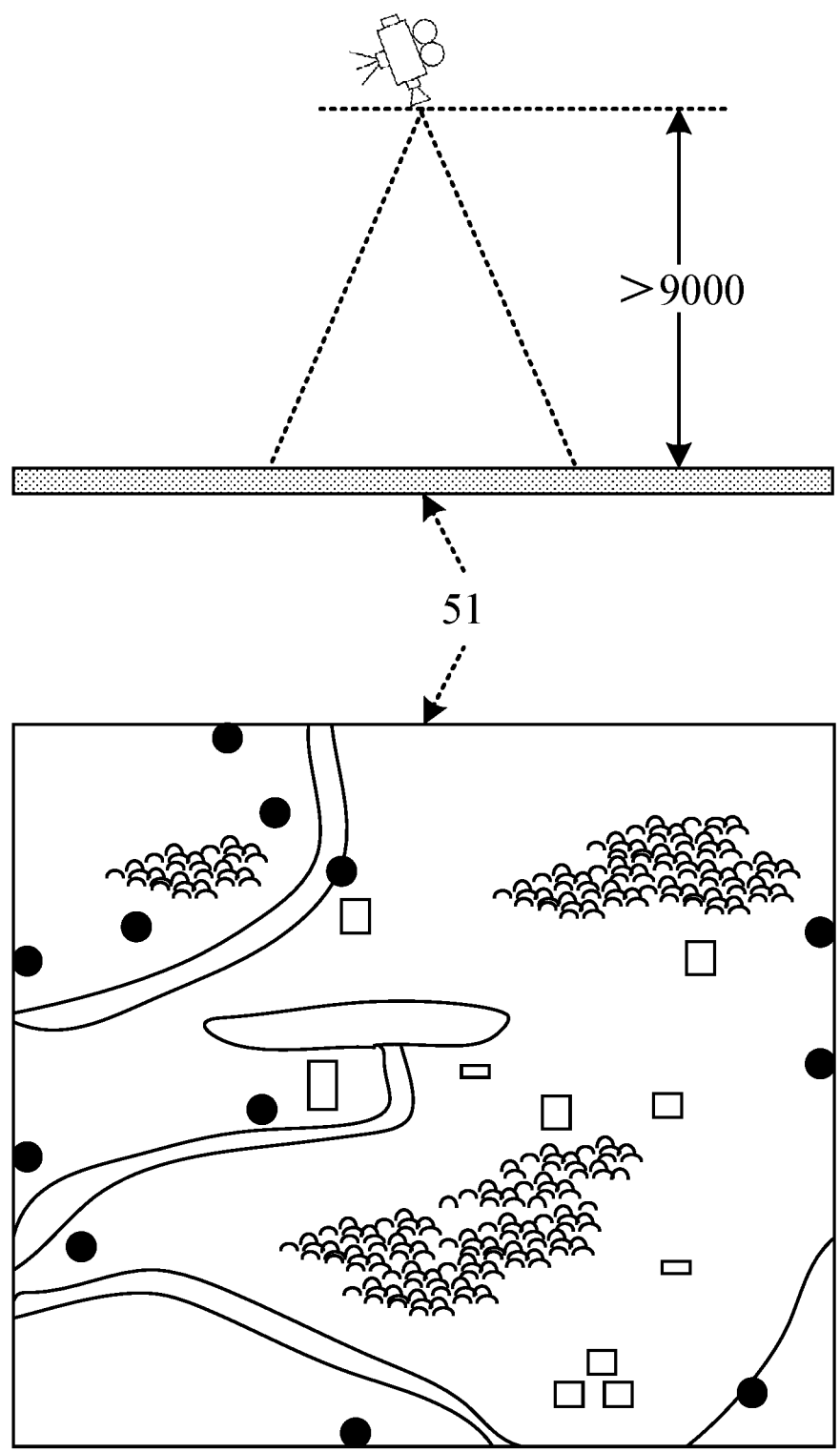
FIG. 5 to FIG. 7 are schematic diagrams of a height and a subject of a virtual camera involved in the embodiment shown in FIG. 4.
Figure 6:
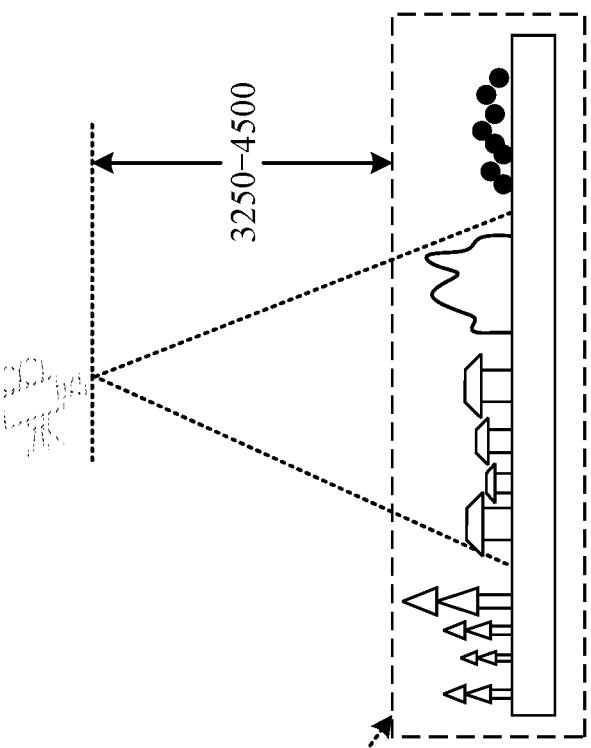
Figure 6:
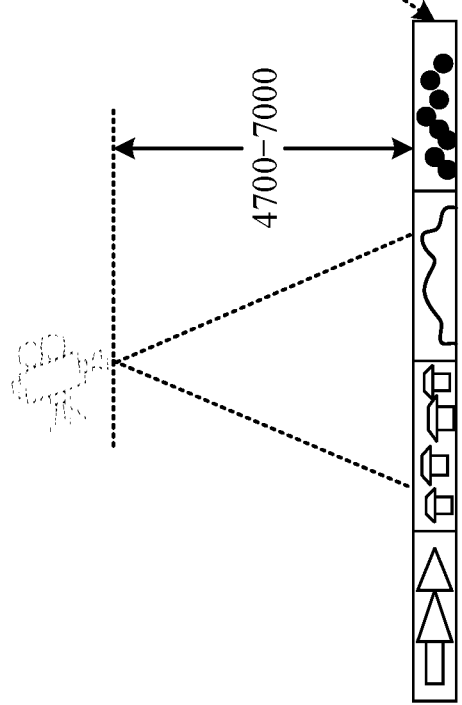
Figure 7:
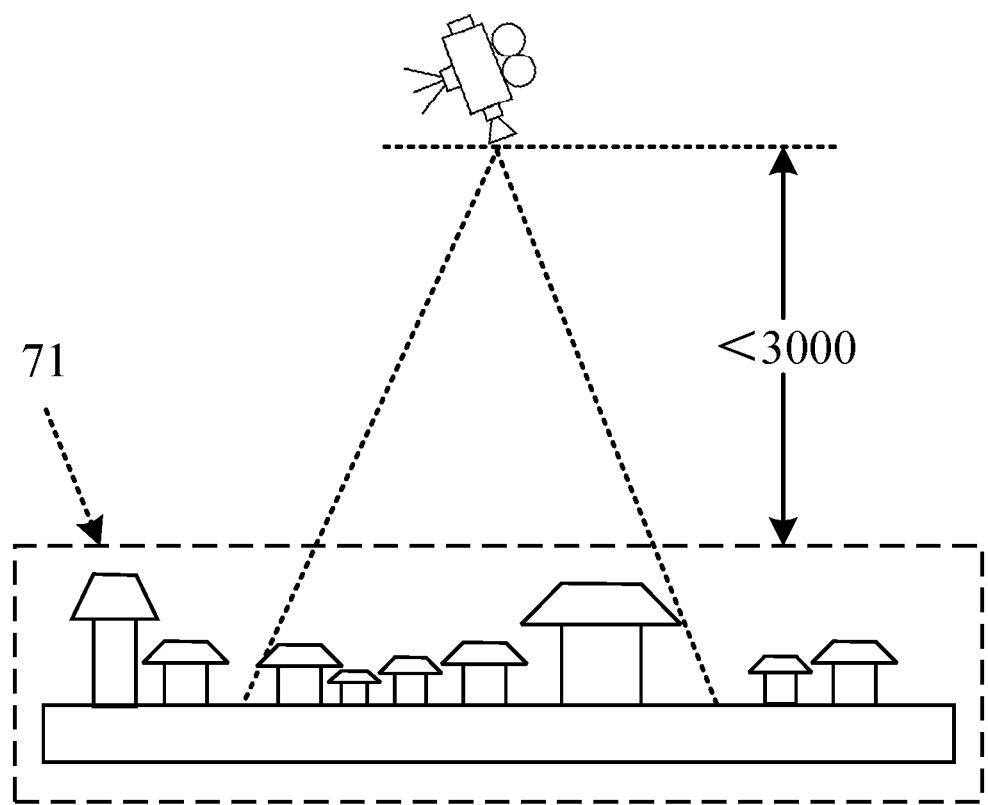

For example, FIG. 5 to FIG. 7 show schematic diagrams of a height and a subject of a virtual camera involved in this embodiment of this application. As shown in FIG. 5, when the height of the virtual camera is greater than 9000, the subject of the virtual camera may be a map 51 of the virtual scene (the corresponding camera state is a map display state). As shown in FIG. 6, when the height of the virtual camera is at a range [3250, 7000], the subject of the virtual camera may be an overall virtual scene 61 (the corresponding camera state is the virtual scene display state). As shown in FIG. 7, when the height of the virtual camera is less than 3000, the subject of the virtual camera may be a certain scene element 71 in the virtual scene (the corresponding camera state is a scene element display state).

As shown in FIG. 6, in this embodiment of this application, when the subject of the virtual camera is an overall virtual scene, the camera state is further divided, that is, the virtual scene display state is divided into a 2D virtual scene display state and a 3D virtual scene display state. For example, when the height of the virtual camera is at a range [3250, 4500], the subject of the virtual camera may be a 3D virtual scene (the corresponding camera state is the 3D virtual scene display state). When the height of the virtual camera is at a range [4700, 7000], the subject of the virtual camera may be a 2D virtual scene (the corresponding camera state is the 2D virtual scene display state).

In a possible implementation, in the application, the camera state may be represented by a camera state level. For example, the scene element display state corresponds to a camera state level 1, the 3D virtual scene display state corresponds to a camera state level 2, the 2D virtual scene display state corresponds to a camera state level 3, and the map display state corresponds to a camera state level 4. When the height of the virtual camera changes, the camera state is switched in an ascending or a descending order.

In this embodiment of this application, when the subject of the virtual camera is an overall virtual scene, the change of the range of the height of the virtual camera may trigger the switching of the representation of the scene image. For example, when the height of the virtual camera increases from a range [3250, 4500] to a range [4700, 7000] under the control of the zoom operation, the virtual scene image is triggered to switch from a 3D scene image (a first scene image) to a 2D scene image (a second scene image). Conversely, when the height of the virtual camera decrease from a range [4700, 7000] to a range [3250, 4500] under the control of the zoom operation, the virtual scene image is triggered to switch from the 2D scene image (the first scene image) to the 3D scene image (the second scene image).

Figure 8:
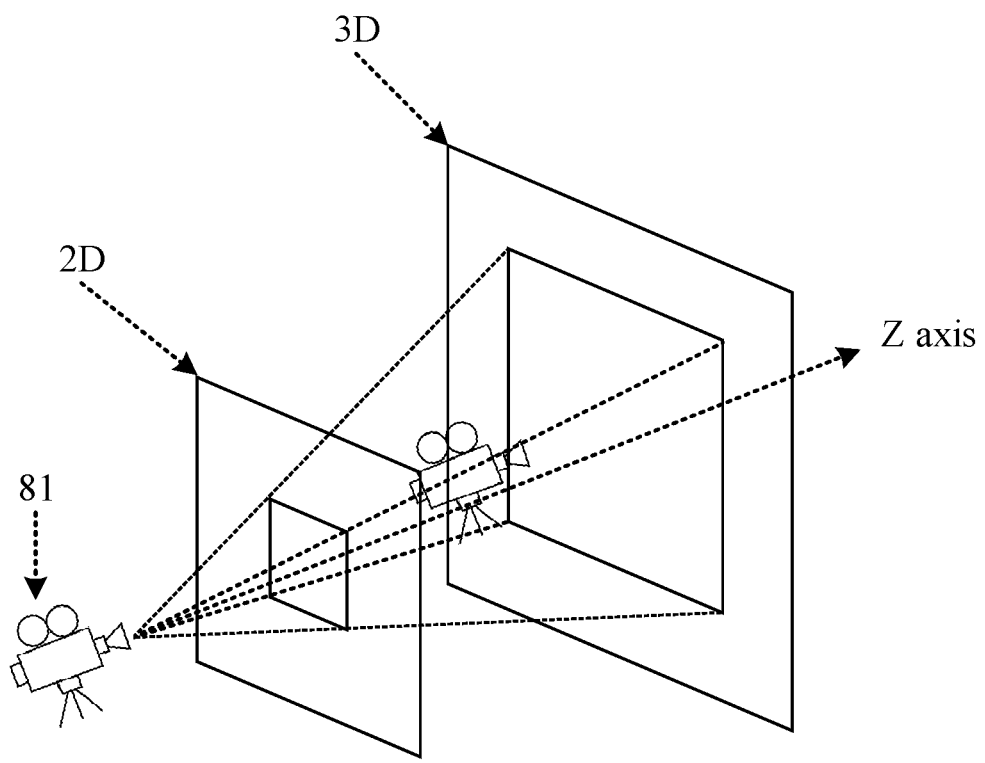
FIG. 8 is a schematic diagram of a height of a camera and a representation involved in the embodiment shown in FIG. 4.

For example, FIG. 8 shows a schematic diagram of a height of a virtual camera and a representation involved in this embodiment of this application. As shown in FIG. 8, in a strategy game, as the player performs a zoom gesture on the screen, a virtual camera 81 moves along the Z axis. If the player performs a gesture zoom-in operation on the screen, the Z coordinate value of the virtual camera 81 increases and the visual range of the virtual camera 81 gradually expands. When the Z coordinate of the virtual camera 81 enters the 2D representation field of view, the representation is automatically switched to the 2D representation for the player. Conversely, if the user performs a zoom-out gesture, the Z coordinate value of the virtual camera 81 decreases and the visual range of the virtual camera 81 decreases. When the Z coordinate of the virtual camera 81 enters the 3D representation field of view, the representation is switched to the 3D representation.

Parameters related to the 2D and 3D representation of the virtual camera may be set in the code of the application. For example, CameraZMinValue and CameraZMaxValue respectively correspond to the maximum value and the minimum value of the Z axis of the camera of the current representation.

The current virtual camera is in a state of WorldCameraStatLevel2 (that is, the foregoing camera state level 2). If the Z axis of the virtual camera continues to increase, when the Z value is greater than the CameraMoveMaxValue (that is, the foregoing 4500) in the current state, the virtual camera is switched to a state of WorldCameraStatLevel3 (that is, the foregoing camera state level 3). The same is true for reverse operation. If the Z value of the camera is less than the CameraMoveMinValue (that is, the foregoing 4700) under the camera state level 3, the camera state of the virtual camera is switched from the WorldCameraStatLevel3 to the WorldCameraStatLevel2.

Each camera state corresponds to the corresponding representation. For example, a close-range camera is designed to view the details of the main city, that is, the foregoing camera state level 1. Common 3D cameras are cameras that render 3D representation, with camera settings different from 2D scenes. Perspective cameras are commonly used in 3D scenes. The camera state level 3 is generally a strategic map camera state in which an orthographic camera is used. During zooming, the modified parameters may be different. The camera state level 4 is a camera state of a world map in which an orthographic camera may also be used.

2) A change rate of the height of the virtual camera meets the condition.

In this embodiment of this application, when the change rate of the height of the virtual camera meets a certain condition, the scene image of the virtual scene may be triggered to switch between the 2D representation and the 3D representation.

For example, when the change rate of the height of the virtual camera is greater than a rate threshold, and the height of the virtual camera controlled by the zoom operation increases (that is, the zoom operation is a zoom-out operation), the scene image of the virtual scene is triggered to switch from the 3D representation to the 2D representation. Alternatively, when the change rate of the height of the virtual camera is greater than a rate threshold, and the height of the virtual camera controlled by the zoom operation decreases (that is, the zoom operation is a zoom-in operation), the scene image of the virtual scene is triggered to switch from the 2D representation to the 3D representation.

3) A change value of the height of the virtual camera meets the condition.

In this embodiment of this application, when the change rate of the height of the virtual camera meets a certain condition, the scene image of the virtual scene may be triggered to switch between the 2D representation and the 3D representation.

For example, when the change value of the height of the virtual camera is greater than a height change threshold, and the height of the virtual camera controlled by the zoom operation increases (that is, the zoom operation is a zoom-out operation), the scene image of the virtual scene is triggered to switch from the 3D representation to the 2D representation. Alternatively, when the change value of the height of the virtual camera is greater than a rate threshold, and the height of the virtual camera controlled by the zoom operation decreases (that is, the zoom operation is a zoom-in operation), the scene image of the virtual scene is triggered to switch from the 2D representation to the 3D representation.

In this embodiment of this application, when the application corresponding to the virtual scene displays a second scene image of the virtual scene in the virtual scene interface in the second representation, a data resource management assembly of the second representation may be activated in response to receiving the zoom operation. The second scene image is displayed in the virtual scene interface in the second representation through the data resource management assembly of the second representation based on the height of the virtual camera after the zoom operation.

In a possible implementation, the application corresponding to the virtual scene may further control a data resource management assembly of the first representation to enter an inactive state; and destroy a data resource managed by the data resource management assembly of the first representation.

In this embodiment of this application, when the application corresponding to the virtual scene starts, two data resource management assemblies respectively corresponding to the 2D representation and the 3D representation may be started, and one of the two data resource management assemblies is in an active state and configured to display the scene image corresponding to the virtual scene. In addition, data resources of two representations are not in common use. Therefore, when one data resource management assembly is in an active state, to save memory resources, the data resource managed by the other data resource management assembly in an inactive state may be destroyed.

Figure 9:
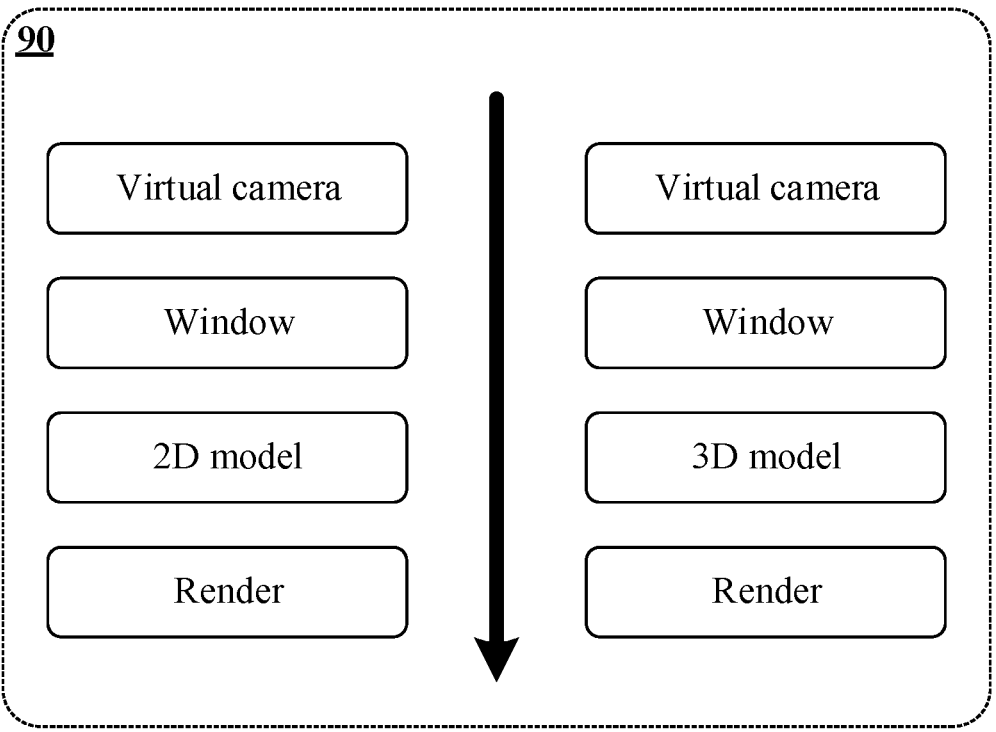
FIG. 9 is a schematic diagram of a common display model involved in the embodiment shown in FIG. 4.

FIG. 9 shows a schematic diagram of a common display model involved in this embodiment of this application. As shown in FIG. 9, in a common display model 90, the model is loaded and displayed according to a visible region of the current virtual camera, and is finally drawn by a graphics processing unit and displayed on the screen.

Figure 10:
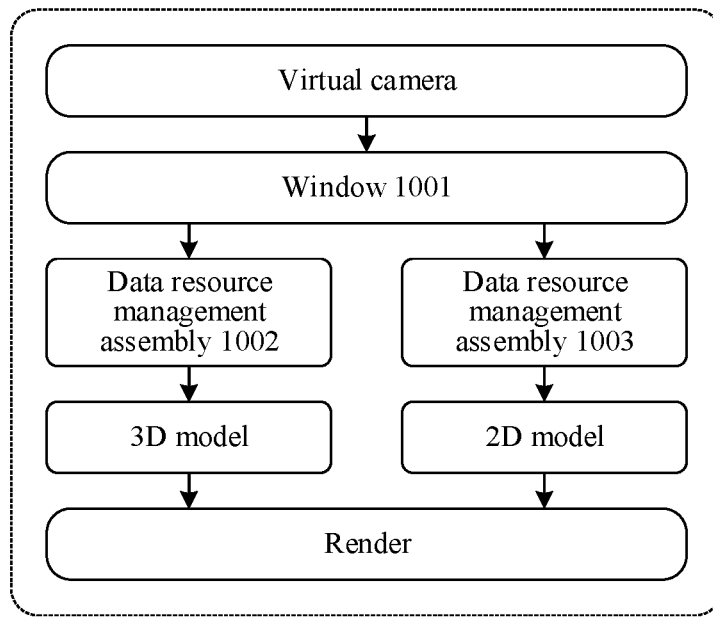
FIG. 10 is a schematic diagram of a display model involved in the embodiment shown in FIG. 4.

FIG. 10 shows a schematic diagram of a display model involved in this embodiment of this application. In this solution, the switching of the two representations is supported, and therefore the display model is redesigned. First, the function of the viewport (window 1001) is enhanced, that is, the window calculates all map grids visible to the player according to the current position of the virtual camera. After calculation, logic processing may not be performed on the content of the grids, but the data continues to be transferred to a data resource management assembly layer for operation.

As shown in FIG. 10, when the virtual camera switches the state, the state of the virtual camera is modified, for example, switching from a 3D camera state to a 2D camera state. In this case, the display of the current 3D virtual scene may be cancelled (that is, a data resource management assembly 1002 corresponding to the 3D representation is cancelled), and then the load of the 2D virtual scene is performed (that is, a data resource management assembly 1003 corresponding to the 2D representation is activated). After that, all representations are performed in a 2D data resource management assembly, and then are rendered by the graphics processing unit, and finally is displayed on the screen. The same is true for reverse operation.

In a possible implementation, a data resource managed by the data resource management assembly of the first representation is destroyed in response to a duration for the data resource management assembly of the first representation in an inactive state reaching a first duration threshold.

In the process of the user using the application corresponding to the virtual scene, scene images of the two representations may be switched frequently in a short time. Accordingly, the application corresponding to the virtual scene also needs to repeatedly load and destroy the data resource, which affects the display effect, for example, jamming is caused frequently.

For this case, in this embodiment of this application, after the application corresponding to the virtual scene controls the scene image to switch between 2D and 3D, a data resource before the switching may be reserved for a period of time. If the user switches back to the previous representation in a short time, the repeated loading and destruction of the data resource can be avoided. If the user does not switch back to the previous representation after a period of time, the previous data resource is destroyed to save the memory space.

In a possible implementation, before the data resource management assembly of the second representation is activated, the application corresponding to the virtual scene may further preload a data resource managed by the data resource management assembly corresponding to the second representation in response to the height change information meeting a second height change condition, where the second height change condition includes: the height change information indicates that the height of the virtual camera is within a height range of the first representation, and a minimum height distance between the height of the virtual camera and a height range of the second representation is less than a distance threshold.

When the representation of the scene image is switched between 2D and 3D, the data resource management assembly needs to be activated and the data resource needs to be loaded, which may generate a certain delay, and affects the smoothness of image switching.

For the foregoing problem, in this embodiment of this application, the data resource can be preloaded to reduce the delay of the image switching between different representations. For example, when the height of the virtual camera is within a height range of the current camera state (for example, within a height range [4700, 7000] corresponding to 2D), but is near a height range of another camera state (for example, the height of the camera is 4800, which is near a height range [3250, 4500] corresponding to 3D), in this case, the application corresponding to the virtual scene may preload the data resource managed by the 3D data resource management assembly to reduce the delay caused by data loading on image switching and improve the smoothness.

In a possible implementation, the second height change condition further includes: the height change information indicates that the height of the virtual camera changes to the height range of the second representation.

Because preloading the resource data occupies a part of the memory resource, to avoid the unnecessary preloading process, in this embodiment of this application, the application corresponding to the virtual scene may further be combined with the height change direction of the virtual camera to determine whether to preload. For example, if the height change information indicates that the height of the virtual camera changes to the height range of the second representation, it indicates that the scene image may switch to the second representation, and preloading is performed at this time. Conversely, if the height change information indicates that the height of the virtual camera changes to an opposite direction of the height range of the second representation, it indicates that the scene image does not switch to the second representation, and preloading is not performed at this time.

In a possible implementation, when the second scene image is displayed in the virtual scene interface in the second representation through the data resource management assembly of the second representation based on the height of the virtual camera after the zoom operation, a target block visible to the user in the virtual scene may be determined based on the height of the virtual camera after the zoom operation; a target data resource of the second representation corresponding to the target block is loaded in static data through the data resource management assembly of the second representation; and the second scene image is displayed in the virtual scene interface in the second representation based on the target data resource.

Figure 11:
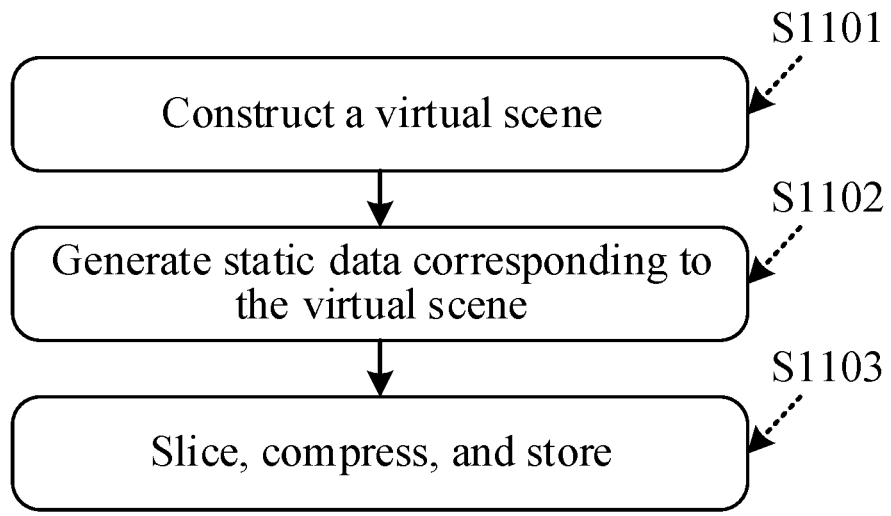
FIG. 11 is a schematic diagram of virtual scene data configuration involved in the embodiment shown in FIG. 4.

In the production process of the virtual scene, an art designer generates all data needed for virtual scene display. FIG. 11 shows a schematic diagram of virtual scene data configuration involved in this embodiment of this application. As shown in FIG. 11, the art designer constructs a virtual scene (S1101), generates static data corresponding to the virtual scene (S1102), and then slices, compresses, and stores all the static data according to the virtual scene. Each block of compressed data corresponds to a block in the virtual scene.

After the art designer completes the game scene, because the data has two representations, secondary processing including data indexing and resource classification needs to be performed on data in various representations, which provides offline static data for resource loading and representation rendering during later operating.

Figure 12:
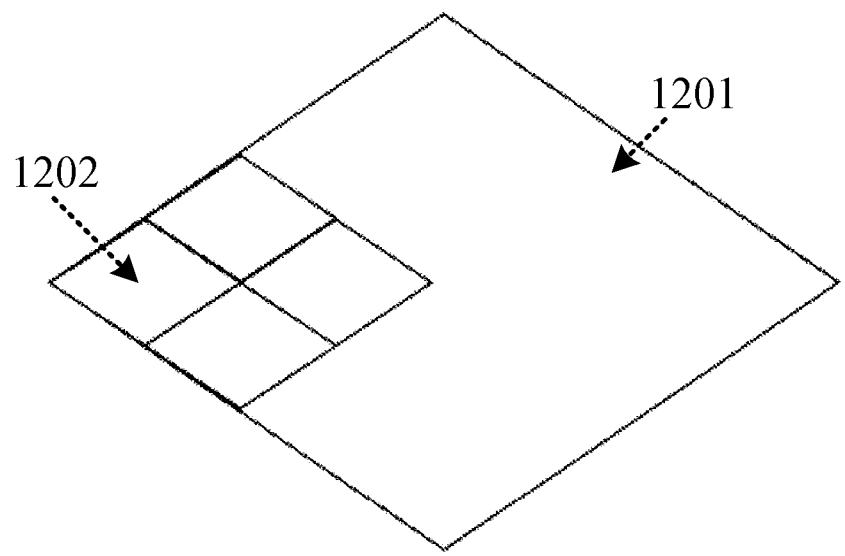
FIG. 12 is a schematic diagram of scene slicing involved in the embodiment shown in FIG. 4.

On this basis, the problem that the data volume increases because of the two representations needs to be resolved. The solution shown in this application adopts a block storage method. FIG. 12 shows a schematic diagram of scene slicing involved in this embodiment in this application. As shown in FIG. 12, the virtual scene may be divided into blocks 1202 of equal size according to a map 1201.

Figure 13:
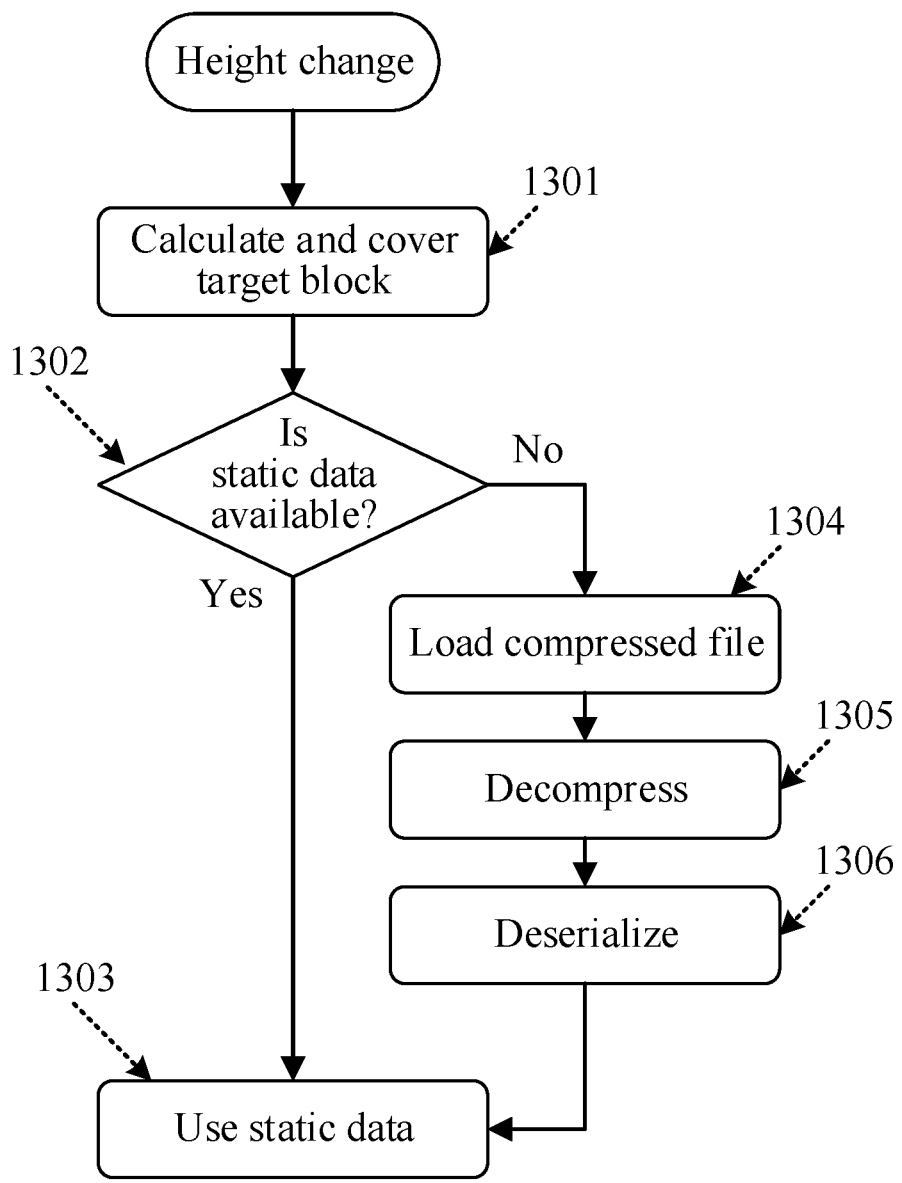
FIG. 13 is a schematic diagram of static data loading involved in the embodiment shown in FIG. 4.

After that, the block data is serialized into a binary file and compressed for storage. In this way, the problem of high consumption of static data in memory during operating can be resolved, and the previous data is reversely operated according to the region where the player window is located during operating. FIG. 13 shows a schematic diagram of static data loading involved in this embodiment of this application. As shown in FIG. 13, when the height of the virtual camera changes, the widow calculates the target block covered by a region visible to the user (S1301), and determines whether existing static data is available (S1302), that is, whether the static data includes the data resource corresponding to the target block is determined. If yes, the static data is directly used for image display (S1303). Otherwise, the compressed file corresponding to the target block is loaded (S1304), decompressed (S1305), deserialized (S1306), and added to the static data, and the image is displayed on the screen using the static data.

In a possible implementation, in response to the static data including other resources than the target data resource, the other resources are deleted from the static data.

In this embodiment of this application, to save memory resources, for other data resources than the target data resource displaying the current image, the application of the virtual scene may delete this part of data resource.

In a possible implementation, the other resources are deleted from the static data in response to an unused duration of the other resources reaching a second duration threshold.

In this embodiment of this application, to avoid a situation that the user adjusts the height of the virtual camera back and forth in a short time, resulting in the same data resource being deleted and loaded repeatedly, when the application of the virtual scene deletes unused data resources in the static data, the data with the unused duration reaching the second duration threshold in the static data can be deleted, and the data with the unused duration not reaching the second duration threshold continues to be reserved.

In a possible implementation, the height range of the first representation and the height range of the second representation may be preset by the developer or the user.

In a possible implementation, the application of the virtual scene may acquire a performance parameter of a terminal displaying the virtual scene interface, where the performance parameter is used for indicating graphic display performance of the terminal; and acquire height range division information based on the performance parameter, where the height range division information includes the height range of the first representation and the height range of the second representation.

In this embodiment of this application, to take into account the virtual scene display effects of the terminals with different performance, the application of the virtual scene may determine different height range division information for the terminals with different performance. For example, for terminals with high graphic display performance, the application of the virtual scene may set a relatively wide height range of the 3D representation, such as [3250, 5500], but for terminals with low graphic display performance, the application of the virtual scene may set a relatively narrow height range of the 3D representation, such as [3250, 4000].

In a possible implementation, the first representation is the 2D representation, the second representation is the 3D representation, and the zoom operation is a zoom-in operation on the virtual scene.

Figure 14:
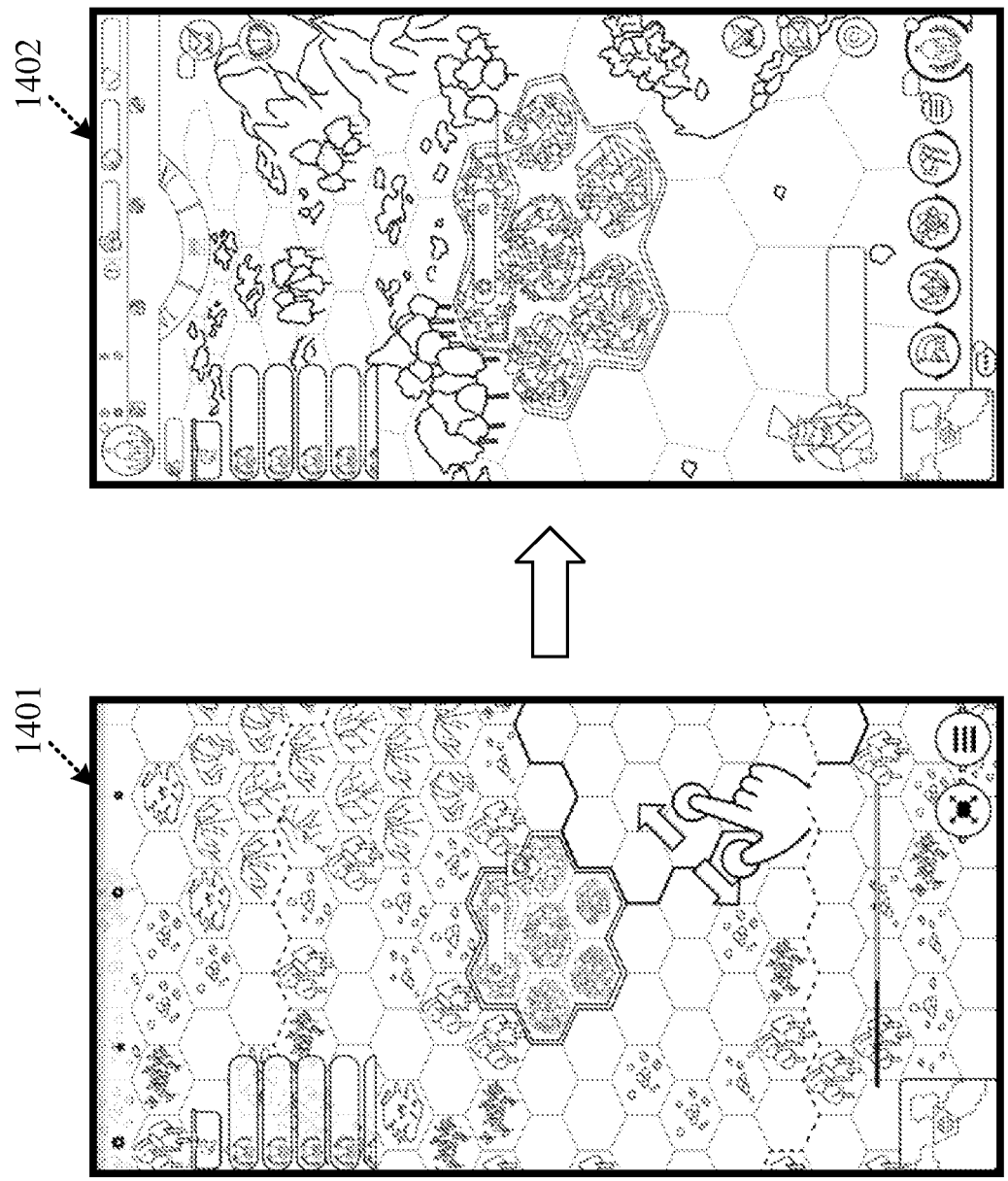
FIG. 14 is a schematic diagram of zooming in a virtual scene involved in the embodiment shown in FIG. 4.

For example, FIG. 14 shows a schematic diagram of zooming in a virtual scene involved in this embodiment of this application. The application of the virtual scene may display a virtual scene interface, the virtual scene interface being used for displaying a scene image of the virtual scene; displays a first scene image 1401 of the virtual scene in the virtual scene interface in a 2D representation; and displays a second scene image 1402 of the virtual scene in a 3D representation in response to receiving a zoom-in operation on the virtual scene and a field of view of the scene image of the zoomed-in virtual scene being less than a field of view threshold.

In another possible implementation, the first representation is the 3D representation, the second representation is the 2D representation, and the zoom operation is a zoom-out operation on the virtual scene.

Figure 15:
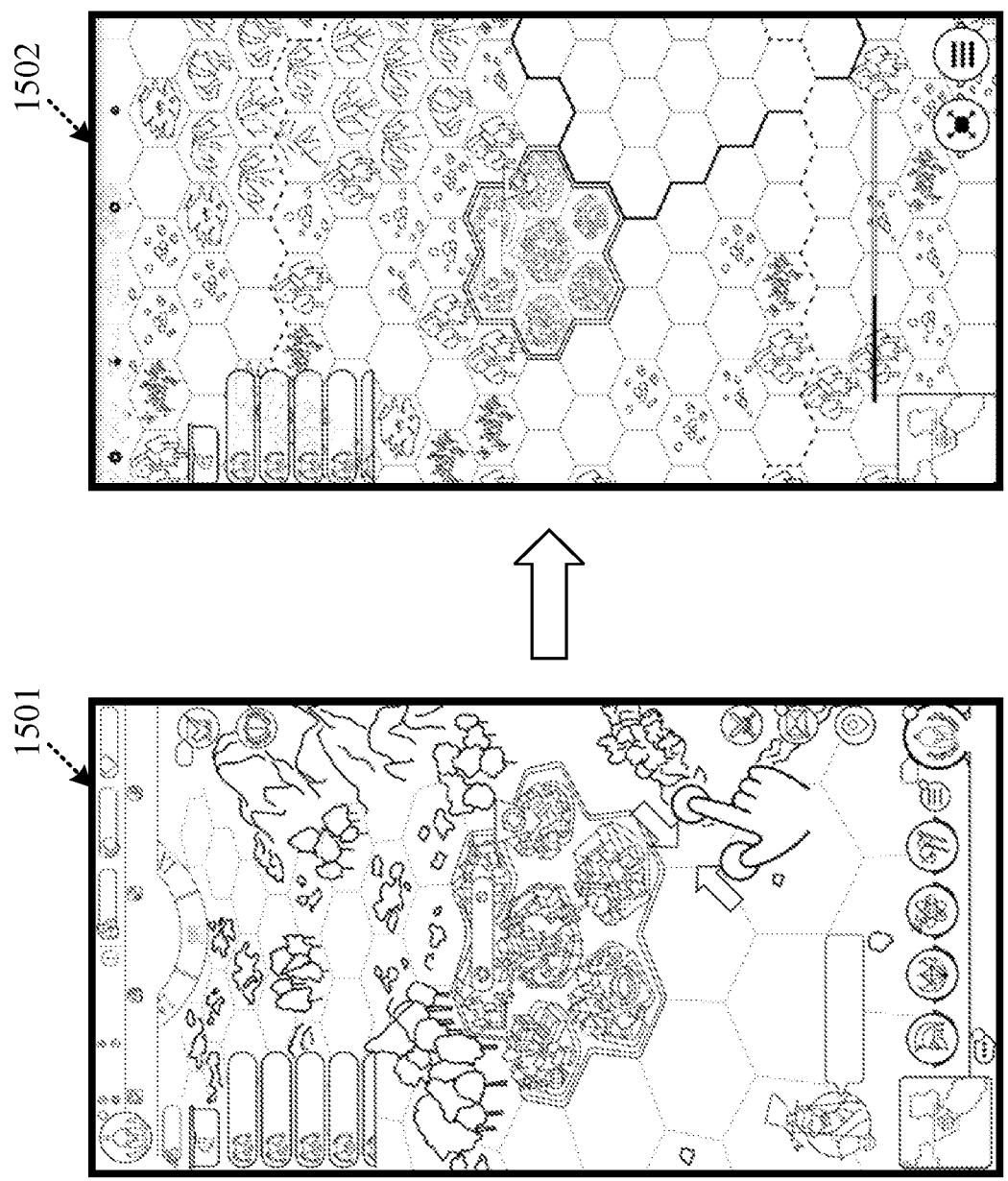
FIG. 15 is a schematic diagram of zooming out a virtual scene involved in the embodiment shown in FIG. 4.

For example, FIG. 15 shows a schematic diagram of zooming out a virtual scene involved in this embodiment of this application. The application of the virtual scene displays a virtual scene interface, the virtual scene interface being used for displaying a scene image of the virtual scene; displays a first scene image 1501 of the virtual scene in the virtual scene interface in a 3D representation; and displays a second scene image 1502 of the virtual scene in a 2D representation in response to receiving a zoom-out operation on the virtual scene and a field of view of the scene image of the zoomed-out virtual scene being greater than a field of view threshold.

In conclusion, in the solutions in the embodiments of this application, in a case that, the scene image is displayed in the virtual scene interface in the 2D representation or the 3D representation, the scene image of the virtual scene can be switched to another representation of the 2D representation and the 3D representation under the trigger of the zoom operation on the virtual scene. In the foregoing process, the user does not need to exit the scene image for setting, and only needs to reuse the zoom operation on the virtual scene, to implement flexible switching of the representation on the scene image, thereby significantly reducing the complexity of the operation process of the user and improving the switching efficiency of the representation of the virtual scene.

Figure 16:
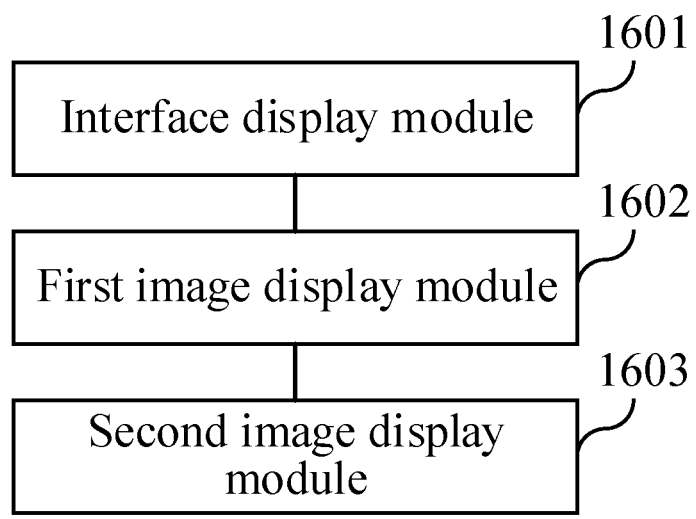
FIG. 16 is a structural block diagram of a virtual scene display apparatus according to an exemplary embodiment of this application.

FIG. 16 is a structural block diagram of a virtual scene display apparatus according to an exemplary embodiment of this application. The apparatus may be configured to perform all or some of the steps in the method shown in FIG. 3 or FIG. 4, and the apparatus includes:
   an interface display module 1601, configured to generate a virtual scene interface, the virtual scene interface including a scene image of a virtual scene captured by a virtual camera;
   a first image display module 1602, configured to display, in the virtual scene interface, a first scene image of one or more virtual objects in the virtual scene captured by the virtual camera using a first representation, the first representation being one of a 2D representation and a 3D representation; and
   a second image display module 1603, configured to, in response to receiving a zoom operation on the virtual scene, display, in the virtual scene interface, a second scene image of the one or more virtual objects in the virtual scene captured by the virtual camera using a second representation, the second representation being the other one of the 2D representation and the 3D representation.

In a possible implementation, the second image display module 1603 includes:
   an information acquisition submodule, configured to acquire, in response to receiving the zoom operation, height change information of a virtual camera before and after the zoom operation, where the virtual camera is configured to collect the scene image of the virtual scene; a height of the virtual camera is used for controlling a field of view of the scene image of the virtual scene; and the height change information of the virtual camera is used for indicating a distance change between the virtual camera and the virtual scene on a vertical coordinate system in the same 3D coordinate system; and
   a display submodule, configured to display the second scene image in the virtual scene interface in the second representation in response to the height change information meeting a first height change condition.

In a possible implementation, the second image display module 1603 further includes:

a condition determining submodule, configured to determine that the height change information meets the first height change condition in response to the height change information indicating that the height of the virtual camera changes from a height range of the first representation to a height range of the second representation.

In a possible implementation, the second image display module 1603 is configured to:

activate a data resource management assembly of the second representation, in response to receiving the zoom operation; and display the second scene image in the virtual scene interface in the second representation through the data resource management assembly of the second representation based on the height of the virtual camera after the zoom operation.

In a possible implementation, the apparatus further includes:

a state control module, configured to control a data resource management assembly of the first representation to enter an inactive state; and a data resource destruction module, configured to destroy a data resource managed by the data resource management assembly of the first representation.

In a possible implementation, the data resource destruction module is configured to destroy the data resource managed by the data resource management assembly of the first representation in response to a duration for the data resource management assembly of the first representation in the inactive state reaching a first duration threshold.

In a possible implementation, the apparatus further includes:

a preload module, configured to preload a data resource managed by the data resource management assembly of the second representation, in response to the height change information meeting a second height change condition, where the second height change condition includes: the height change information indicates that the height of the virtual camera is within a height range of the first representation, and a minimum height distance between the height of the virtual camera and a height range of the second representation is less than a distance threshold.

In a possible implementation, the second height change condition further includes: the height change information indicates that the height of the virtual camera changes to the height range of the second representation.

In a possible implementation, the second image display module 1603 is configured to:

determine a target block visible to a user in the virtual scene based on the height of the virtual camera after the zoom operation;

load a target data resource of the second representation corresponding to the target block in static data through the data resource management assembly of the second representation; and display the second scene image in the virtual scene interface in the second representation based on the target data resource.

In a possible implementation, the apparatus further includes:

a data deletion module, configured to delete, in response to the static data including other resources than the target data resource, the other resources from the static data.

In a possible implementation, the data deletion module is configured to delete the other resources from the static data in response to an unused duration of the other resources reaching a second duration threshold.

In a possible implementation, the apparatus further includes:

a performance parameter acquisition module, configured to acquire a performance parameter of a terminal displaying the virtual scene interface, wherein the performance parameter is used for indicating graphic display performance of the terminal; and a range division information acquisition module, configured to acquire height range division information based on the performance parameter, where the height range division information includes the height range of the first representation and the height range of the second representation.

In a possible implementation, the first representation is the 2D representation, the second representation is the 3D representation, and the zoom operation is a zoom-in operation on the virtual scene; or the first representation is the 3D representation, the second representation is the 2D representation, and the zoom operation is a zoom-out operation on the virtual scene.

In conclusion, in the solutions in the embodiments of this application, when the scene image is displayed in the virtual scene interface in the 2D representation or the 3D representation, the scene image of the virtual scene can be switched to another representation of the 2D representation and the 3D representation under the trigger of the zoom operation on the virtual scene. In the foregoing process, the user does not need to exit the scene image for setting, and only needs to reuse the zoom operation on the virtual scene, to implement flexible switching of the representation on the scene image, thereby significantly reducing the complexity of the operation process of the user and improving the switching efficiency of the representation of the virtual scene.

Figure 17:
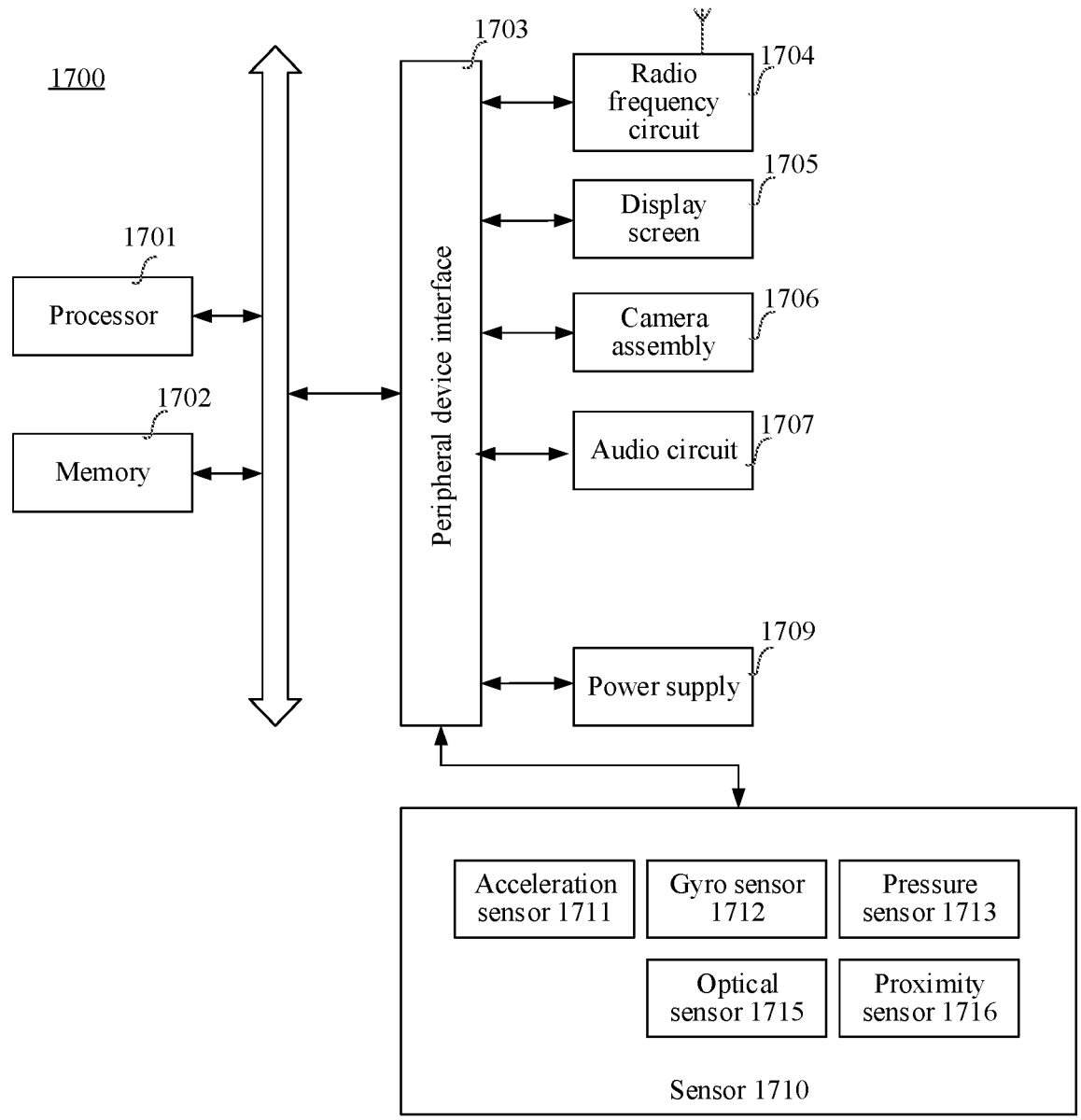
FIG. 17 is a structural block diagram of a computer device according to an exemplary embodiment of this application.

FIG. 17 is a structural block diagram of a computer device 1700 according to an exemplary embodiment. The computer device 1700 may be a user terminal, such as a smartphone, a tablet computer, a moving picture experts group audio layer III (MP3) player, a moving picture experts group audio layer IV (MP4) player, a notebook computer, or a desktop computer. The computer device 1700 may be further referred to as another name such as user equipment, a portable terminal, a laptop terminal, or a desktop terminal.

Generally, the computer device 1700 includes: a processor 1701 and a memory 1702.

The processor 1701 may include one or more processing cores, such as a 4-core processor or an 8-core processor. The processor 1701 may be implemented by at least one hardware form in a digital signal processing (DSP), a field-programmable gate array (FPGA), and a programmable logic array (PLA).

The memory 1702 may include one or more computer-readable storage media. The computer-readable storage media may be non-transitory. The memory 1702 may further include a high-speed random access memory, as well as non-volatile memory, such as one or more disk storage devices and flash storage devices. In some embodiments, the non-transitory computer-readable storage medium in the memory 1702 is configured to store at least one computer program, and the at least one computer program is configured to be executed by the processor 1701 to implement all steps or a part of the steps in the method provided in the method embodiments of this application.

In some embodiments, the computer device 1700 may further include: a peripheral interface 1703 and at least one peripheral device. The processor 1701, the memory 1702, and the peripheral device interface 1703 may be connected by using a bus or a signal cable. Each peripheral device may be connected to the peripheral device interface 1703 by using a bus, a signal line, or a circuit board. Specifically, the peripheral device includes: at least one of a radio frequency circuit 1704, a display screen 1705, a camera assembly 1706, an audio circuit 1707, and a power supply 1709.

In some embodiments, the computer device 1700 further comprises one or more sensors 1710. The one or more sensors 1710 comprise but are not limited to an acceleration sensor 1711, a gyro sensor 1712, a pressure sensor 1713, an optical sensor 1715, and a proximity sensor 1716.

A person skilled in the art may understand that the structure shown in FIG. 17 does not constitute any limitation on the computer device 1700, and the computer device may include more components or fewer components than those shown in the figure, or some components may be combined, or a different component deployment may be used.

In an exemplary embodiment, a non-temporary computer-readable storage medium including an instruction is further provided. For example, a memory including at least one computer program. The at least one computer program may be executed by a processor to implement all or some steps in the method shown in the embodiment corresponding to FIG. 3 or FIG. 4. For example, the non-transitory computer readable storage medium may be a read-only memory (ROM), a random access memory (RAM), a compact disc read-only memory (CD-ROM), a magnetic tape, a floppy disk, an optical data storage device, and the like.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various implementations in the foregoing aspects.

Other embodiments of this application will be apparent to a person skilled in the art from consideration of the specification and practice of the disclosure here. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of the present application are pointed out in the following claims.

It is to be understood that this application is not limited to the precise structures described above and shown in the accompanying drawings, and various modifications and changes can be made without departing from the scope of this application. The scope of this application is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A virtual scene display method performed by a computer device, the method comprising:
    generating a virtual scene interface, the virtual scene interface including a scene image of one or more virtual objects in a virtual scene captured by a virtual camera;
    determining, between a 2D representation and a 3D representation, a first representation in accordance with a first height distance between the virtual camera and the one or more virtual objects in the virtual scene;
    displaying, in the virtual scene interface, a first scene image of the one or more virtual objects in the virtual scene captured by the virtual camera using the first representation at the first height distance and with a predefined angle of view of the virtual camera; and
    in response to receiving a zoom operation on the virtual scene, acquiring height change information of the virtual camera from (i) the first height distance between the virtual camera and the one or more virtual objects in the virtual scene to (ii) a second height distance between the virtual camera and the one or more virtual objects in the virtual scene, the height change information of the virtual camera is used for indicating a distance change between the virtual camera and the virtual scene;
    when the height change information meets a first height change condition:
    determining, between the 2D representation and the 3D representation, a second representation in accordance with the second height distance between the virtual camera and the one or more virtual objects in the virtual scene, the second representation being different from the first representation; and
    displaying, in the virtual scene interface, a second scene image of the one or more virtual objects in the virtual scene captured by the virtual camera using the second representation at the second height distance and with the predefined angle of view of the virtual camera.

2. The method according to claim 1, wherein the displaying, in the virtual scene interface, a second scene image of the one or more virtual objects in the virtual scene captured by the virtual camera using the second representation comprises:
    activating a data resource management assembly of the second representation in accordance with the second height distance between the virtual camera and the one or more virtual objects in the virtual scene; and
    displaying the second scene image in the virtual scene interface using the second representation through the activated data resource management assembly of the second representation, based on the height change information of the virtual camera after the zoom operation.

3. The method according to claim 2, wherein the method further comprises:
controlling a data resource management assembly of the first representation to enter an inactive state; and
destroying a data resource managed by the data resource management assembly of the first representation.

4. The method according to claim 2, wherein before the activating a data resource management assembly of the second representation, the method further comprises:
preloading a data resource managed by the data resource management assembly of the second representation in response to the height change information meeting a second height change condition.

5. The method according to claim 2, wherein the displaying the second scene image in the virtual scene interface using the second representation through the data resource management assembly of the second representation, based on the height change information of the virtual camera after the zoom operation comprises:
determining a target block visible to a user in the virtual scene based on the height change information of the virtual camera after the zoom operation;
loading a target data resource of the second representation corresponding to the target block in static data through the data resource management assembly of the second representation; and
displaying the second scene image in the virtual scene interface using the second representation based on the target data resource.

6. The method according to claim 1, wherein the method further comprises:
acquiring a performance parameter of the computer device displaying the virtual scene interface, wherein the performance parameter is used for indicating graphic display performance of the computer device; and
acquiring height range division information based on the performance parameter, wherein the height range division information comprises a height range of the first representation and a height range of the second representation.

7. The method according to claim 1, wherein
the first representation is the 2D representation, the second representation is the 3D representation, and the zoom operation is a zoom-in operation on the virtual scene; or
the first representation is the 3D representation, the second representation is the 2D representation, and the zoom operation is a zoom-out operation on the virtual scene.

8. A computer device, comprising a processor and a memory, the memory storing at least one computer program, the at least one computer program being loaded and executed by the processor and causing the computer device to implement a virtual scene display method including:
generating a virtual scene interface, the virtual scene interface including a scene image of one or more virtual objects in a virtual scene captured by a virtual camera;
determining, between a 2D representation and a 3D representation, a first representation in accordance with a first height distance between the virtual camera and the one or more virtual objects in the virtual scene;
displaying, in the virtual scene interface, a first scene image of the one or more virtual objects in the virtual scene captured by the virtual camera using the first representation at the first height distance and with a predefined angle of view of the virtual camera; and
in response to receiving a zoom operation on the virtual scene, acquiring height change information of the virtual camera from (i) the first height distance between the virtual camera and the one or more virtual objects in the virtual scene to (ii) a second height distance between the virtual camera and the one or more virtual objects in the virtual scene, the height change information of the virtual camera is used for indicating a distance change between the virtual camera and the virtual scene;
when the height change information meets a first height change condition:
determining, between the 2D representation and the 3D representation, a second representation in accordance with the second height distance between the virtual camera and the one or more virtual objects in the virtual scene, the second representation being different from the first representation; and
displaying, in the virtual scene interface, a second scene image of the one or more virtual objects in the virtual scene captured by the virtual camera using the second representation at the second height distance and with the predefined angle of view of the virtual camera.

9. The computer device according to claim 8, wherein the displaying, in the virtual scene interface, a second scene image of the one or more virtual objects in the virtual scene captured by the virtual camera using the second representation comprises:
activating a data resource management assembly of the second representation in accordance with the second height distance between the virtual camera and the one or more virtual objects in the virtual scene; and
displaying the second scene image in the virtual scene interface using the second representation through the activated data resource management assembly of the second representation, based on the height change information of the virtual camera after the zoom operation.

10. The computer device according to claim 9, wherein the method further comprises:
controlling a data resource management assembly of the first representation to enter an inactive state; and
destroying a data resource managed by the data resource management assembly of the first representation.

11. The computer device according to claim 9, wherein before the activating a data resource management assembly of the second representation, the method further comprises:
preloading a data resource managed by the data resource management assembly of the second representation in response to the height change information meeting a second height change condition.

12. The computer device according to claim 9, wherein the displaying the second scene image in the virtual scene interface using the second representation through the data resource management assembly of the second representation, based on the height change information of the virtual camera after the zoom operation comprises:
determining a target block visible to a user in the virtual scene based on the height change information of the virtual camera after the zoom operation;
loading a target data resource of the second representation corresponding to the target block in static data through the data resource management assembly of the second representation; and
displaying the second scene image in the virtual scene interface using the second representation based on the target data resource.

13. The computer device according to claim 8, wherein the method further comprises:
   acquiring a performance parameter of the computer device displaying the virtual scene interface, wherein the performance parameter is used for indicating graphic display performance of the computer device; and
   acquiring height range division information based on the performance parameter, wherein the height range division information comprises a height range of the first representation and a height range of the second representation.

14. The computer device according to claim 8, wherein
   the first representation is the 2D representation, the second representation is the 3D representation, and the zoom operation is a zoom-in operation on the virtual scene; or
   the first representation is the 3D representation, the second representation is the 2D representation, and the zoom operation is a zoom-out operation on the virtual scene.

15. A non-transitory computer-readable storage medium, storing at least one computer program, the at least one computer program being loaded and executed by a processor of a computer device and causing the computer device to implement a virtual scene display method including:
   generating a virtual scene interface, the virtual scene interface including a scene image of one or more virtual objects in a virtual scene captured by a virtual camera;
   determining, between a 2D representation and a 3D representation, a first representation in accordance with a first height distance between the virtual camera and the one or more virtual objects in the virtual scene;
   displaying, in the virtual scene interface, a first scene image of the one or more virtual objects in the virtual scene captured by the virtual camera using the first representation at the first height distance and with a predefined angle of view of the virtual camera; and
   in response to receiving a zoom operation on the virtual scene, acquiring height change information of the virtual camera from (i) the first height distance between the virtual camera and the one or more virtual objects in the virtual scene to (ii) a second height distance between the virtual camera and the one or more virtual objects in the virtual scene, the height change information of the virtual camera is used for indicating a distance change between the virtual camera and the virtual scene;
   when the height change information meets a first height change condition:
   determining, between the 2D representation and the 3D representation, a second representation in accordance with the second height distance between the virtual camera and the one or more virtual objects in the virtual scene, the second representation being different from the first representation; and
   displaying, in the virtual scene interface, a second scene image of the one or more virtual objects in the virtual scene captured by the virtual camera using the second representation at the second height distance and with the predefined angle of view of the virtual camera.

16. The non-transitory computer-readable storage medium according to claim 15, wherein the method further comprises:
   acquiring a performance parameter of the computer device displaying the virtual scene interface, wherein the performance parameter is used for indicating graphic display performance of the computer device; and
   acquiring height range division information based on the performance parameter, wherein the height range division information comprises a height range of the first representation and a height range of the second representation.

17. The non-transitory computer-readable storage medium according to claim 15, wherein
   the first representation is the 2D representation, the second representation is the 3D representation, and the zoom operation is a zoom-in operation on the virtual scene; or
   the first representation is the 3D representation, the second representation is the 2D representation, and the zoom operation is a zoom-out operation on the virtual scene.

* * * * *